United States Patent [19]
Simpson

[11] Patent Number: 5,377,163
[45] Date of Patent: Dec. 27, 1994

[54] ACTIVE BROADBAND ACOUSTIC METHOD AND APPARATUS FOR IDENTIFYING AQUATIC LIFE

[76] Inventor: Patrick K. Simpson, 17436 Ashburton Rd., San Diego, Calif. 92128

[21] Appl. No.: 146,738

[22] Filed: Nov. 1, 1993

[51] Int. Cl.$^5$ .............................................. G01S 15/96
[52] U.S. Cl. .................................... 367/131; 367/135; 367/137; 367/87
[58] Field of Search .................. 367/131, 135, 137, 87; 209/590

[56] References Cited
U.S. PATENT DOCUMENTS
5,025,423 6/1991 Earp .................................. 367/135

Primary Examiner—Daniel T. Pihulic

[57] ABSTRACT

The identity of an aquatic organism is determined by a signature derived from a broadband acoustic signal transmitted and received by a broadband transducer or transmitted by a an broadband acoustic transmitter and received by an array of broadband acoustic receivers. The signature is a set of classifier coefficients created from a training processing that learns to discriminate between various size/taxa of aquatic life forms using features extracted from the received broadband echoes. The signature database used for classification during operation is stored on a portable storage medium. The degree to which the signals collected from an unknown aquatic life form matches the predefined known aquatic life form is then reported to a utilizing device.

10 Claims, 10 Drawing Sheets

ACTIVE BROADBAND ACOUSTIC METHOD AND APPARATUS FOR IDENTIFYING AQUATIC LIFE

FIELD OF INVENTION

This invention relates to sonar devices, specifically as such devices are applied to the detection and identification of aquatic life forms.

DESCRIPTION OF PRIOR ART

Commercially available sonar products are highly dependent on operator expertise for their effectiveness. They are used primarily to locate aquatic organisms, such as fish, and are not capable of automatically identifying the number and/or size and/or taxa (i.e. family, genus, species) of the aquatic life form. Current systems emit a narrowband high frequency sonar signal (such as 38 kHz, 50 kHz, or 200 kHz). This signal is called a ping. An echo is the energy reflected off either an underwater objects (such as air bubbles, plant life, or aquatic life) or the bottom. Each sonar ping produces several echoes. The time between the ping and the return of an echo is used to determine the depth of the reflecting body. Echo intensity (energy) is displayed on a monitor. As an examples of this type of processing, some fish finding sonar systems display this intensity in color and others use monochrome. By learning the correlation between the intensity, the location, and past experiences, it is possible for some sonar operators to determine what the echoes represent (such as fish species, size or abundance), but only the most expensive systems with the most experienced operators are able to obtain such functionality regularly and accurately.

This invention describes a system that is capable of determining the size and/or taxa of aquatic life forms by processing the echoes produces from of broadband acoustic signals emissions (e.g. frequency modulated chirps, acoustic solitons, or clicks) to determine the size and/or taxa of the reflecting aquatic life form. Existing aquatic sonar systems focus the emitted acoustic energy in a single frequency and collect the echoes in a passband in that narrow frequency range. The aquatic life forms (such as fish) reflect, absorb and resonate the single frequency differently depending on shape, size, quantity, and aspect angle. Reflected acoustic energy is then measured in the echo. By using a single narrowband acoustic signal, this technique limits the amount of information to only the intensity of the return of the signal over time. Because aquatic life forms reflect acoustic energy in many different ways, a single narrowband acoustic signal is not robust enough for processing an arbitrary aquatic life form return. Utilizing broadband signals provides a great deal more information in the echo that can be used to identify the reflecting aquatic object, but intensity displays alone are not sufficient for processing these returns. As an alternative, a feature extraction and pattern classifier is used to automatically identify the aquatic life form reflecting the broadband acoustic signal. This invention describes a method and several embodiments of an automatic aquatic life form identification system that utilizes a combination of broadband acoustic signals, feature extraction, and classification. The methods and apparatus described herein are those involved with fisheries management, commercial fishing, sport fishing, and environmental monitoring.

There are several inventions that have described the use of sonar to identify aquatic life forms, including the following U.S. Pat. Nos.:

3,757,286 Apparatus for Detecting Aquatic Animals, Richard (1970);
3,870,988 Hybrid Carrier Beam Sonar, Turner (1969);
3,893,061 Underwater Acoustic Detection System, Slawsky (1970);
4,013,991 Fish Locator, Balcom (1977);
4,050,308 Electronic fish locator, Lee (1977);
4,081,783 Fish Finder Capable of Discriminating Sizes of Fish, Honda (1976);
4,084,148 Object Recognition System, Koshikawa (1976);
4,122,432 Device for Identifying Noise Sources, Triebold et al. (1971);
4,173,008 Method and Apparatus for Passive Detection of Marine Objects, Keith (1971);
4,509,151 Marine Acoustic Analysis System and Method, Anderson (1982);
5,099,455 Passive Acoustic Aquatic Animal Finder Apparatus and Method, Parra (1992);
5,168,471 Integrated Passive Acoustic and Active Ultrasonic Marine Aquatic Finder System, Parra (1992);
5,168,473 Integrated Passive Acoustic and Active Ultrasonic Marine Aquatic Finder System, Parra (1992);

The invention disclosed herein is distinguishes itself from this prior art in at least three ways:

(1) The invention disclosed herein specifically rites the use of broadband active acoustic signals to generate broadband acoustic echoes;

(2) The invention disclosed herein specifically cites the use of a classifier that automatically determines the identify of known aquatic life forms; and (3) The invention disclosed herein specifically cites the use of portable signature database that holds classifier coefficients used during identification.

Beyond U.S. Patents, the only related work similar to the invention disclosed herein was described by Ontario Hydro Research (Ramani, N. & Patrick, P. (1992). Fish detection and classification using neural networks - some laboratory results, *IEEE J. Oceanic Eng.*, Vol 17, pp. 364–368). Ontario Hydro's approach is also different from the invention disclosed herein in that they utilize a narrowband high frequency transmission coupled with broadband reception and this disclosure specifically cites the use of broadband transmission. In addition, Ontario Hydro does not cite the use of a portable signature database, rather their storage is static.

Objects and Advantages

According to this invention, a broadband acoustic signal (such as a frequency modulated chirp or a series of clicks) is emitted from an acoustic transmitter in an aquatic environment (i.e. a lake, river, stream, dam, ocean, bay, inlet, or some other body of water capable of supporting aquatic life). Transmitted broadband signals bounce off of underwater objects and are collected, stored, and processed at a broadband receiver. A sonar control function controls three types of processing:

(1) The generation and transmission of a wide variety of broadband acoustic signals, and (2) The reception, digitization, and storage of broadband acoustic signals, and collateral information such as the identity of the aquatic life form (for classifier training), geographical location, sea conditions, and environmental parameters, and (3) The processing of broadband digitized acoustic signals to produce and display the identification of the aquatic life that produced echoes.

As a specific example of the application of this method, a broadband frequency modulated chirp is generated from 50 kHz to 200 kHz, it is amplified and transmitted by a broadband transducer. The echoes from aquatic life forms, such as fish or marine mammals, is received by the same transducer and digitized at least the Nyquist rate, say 500 kHz. Following digitization, the time series is passed to an echo detection function that extracts the echoes and discards the remainder of the time series. The time series from the echoes are passed along to the feature extraction function which measures certain features within an echo or over a series of consecutive echoes. The features might result from Fourier analysis, wavelet analysis, higher-order spectral analysis, instantaneous time-frequency analysis, or heuristic features measured directly from the time series. During a prior training process, these same features are extracted from a ground truthed set of echoes and used to create a signature for each class of interest (such as Sockeye Salmon 25-35 cm long). The signatures for each class are stored in a signature database that allows portable storage (such as a Read Only Memory (ROM) card, Digital Audio Tape (DAT), or Compact Disc (CD)-ROM). During operation, the extracted features are passed directly to the classifier function where they are compared with the previously stored signatures and used to automatically identify the aquatic life form (or determine that the extracted features do not correspond with any known signature). The results from the classification function are passed to a man-machine interface that displays the results of the automatic classifications as well as change some system parameters.

The ability to automatically identify an aquatic life form by size and/or taxa will enhance fisheries management's ability to monitor and control its resources. Three possible embodiments of this invention for this application include riverine fisheries management, marine fisheries management, and hydropower fisheries management.

Figure 6A:
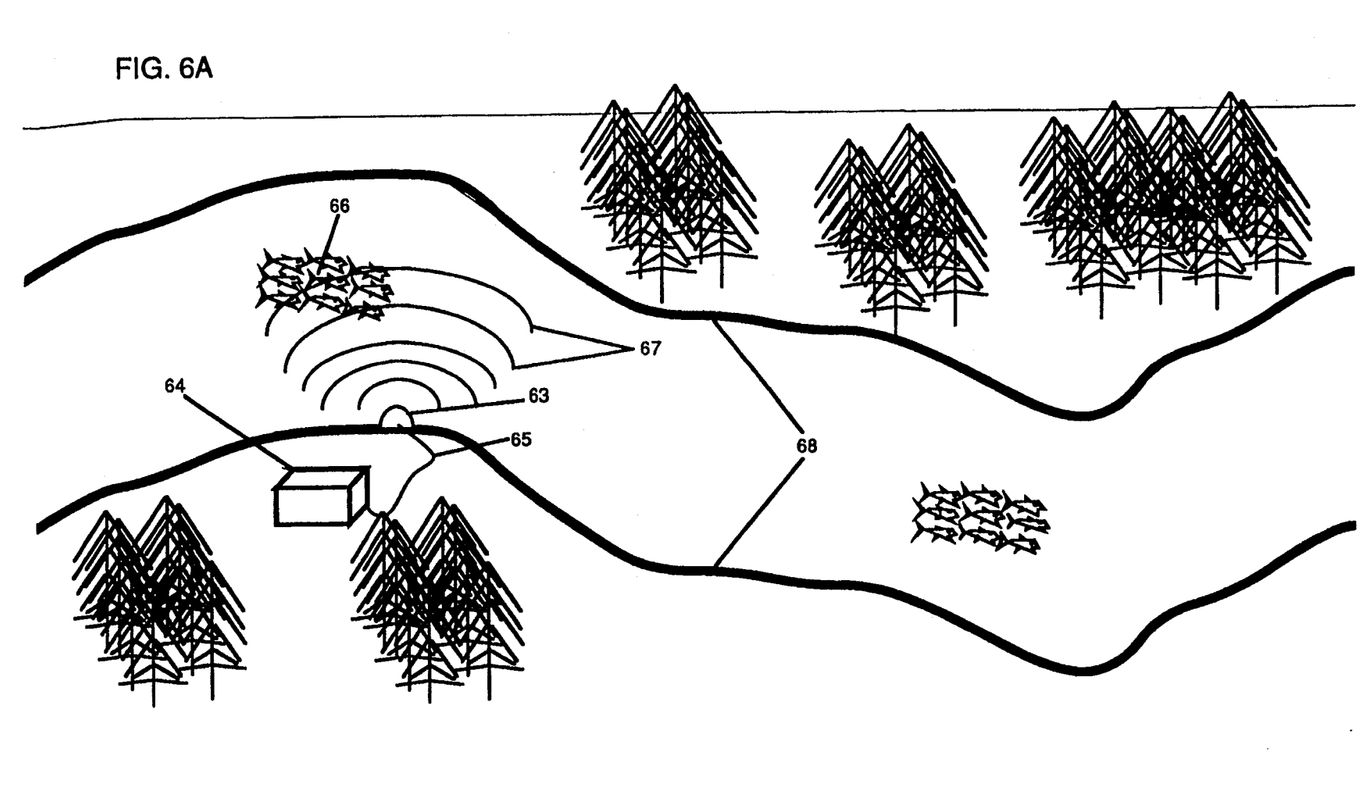
FIG. 6A provides a characterization of the use of this invention in a shore-based embodiment.
Figure 6B:
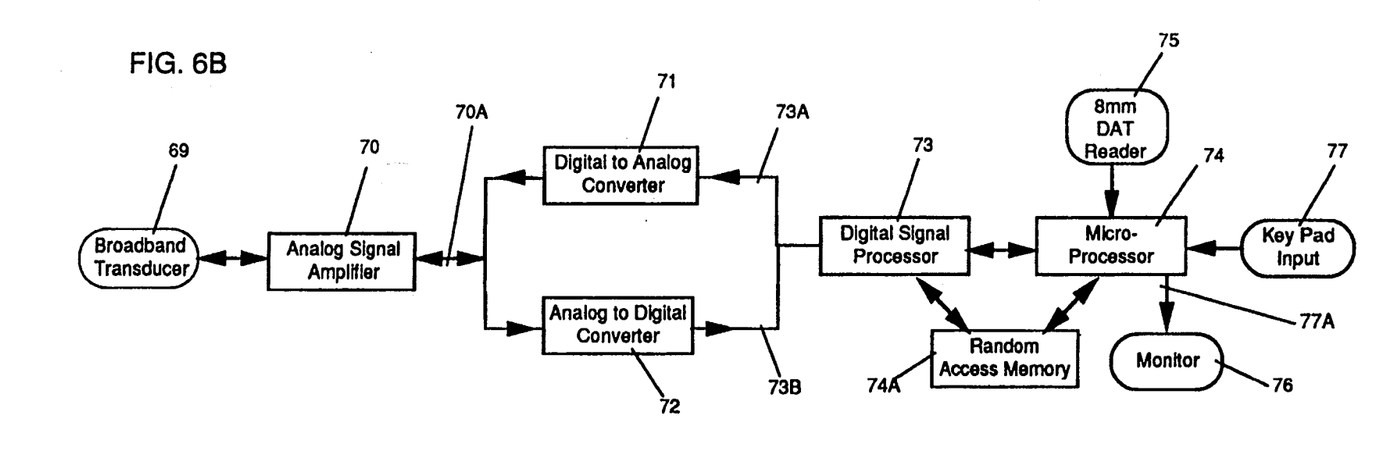
FIG. 6B illustrates a possible hardware configuration for the shore-based embodiment of this invention as it might be applied to commercial fishing, sport fishing, fisheries management, or environmental monitoring.

A riverine fisheries management embodiment of this invention would provide local, state, and federal biologists, scientists, and fish & wildlife officers with a system that would automatically count and report the size and taxa of fish that have passed a specific point along a river, stream, or tributary. FIG. 6 provides an example of this embodiment of the invention.

A marine fisheries management embodiment of this invention would provide local, state, and federal biologists, scientists, and fish & wildlife officers with a system that would automatically report the size and taxa of fish that have passed within the sonar's beam within a given volume of water. Using this embodiment of the invention will allow fisheries managers to monitor marine life without relying on catch or harvest statistics. This embodiment of this invention might be a ship-based sonar system (such as that shown in FIG. 3), a towed-array system (such as that shown in FIG. 4), or a buoy deployed system (such as that shown in FIG. 5).

A hydropower fisheries management embodiment of this invention would provide hydropower facility managers and/or their cognizant monitors with a system that would automatically report fish size and taxa that have passed within the sonar's beam within a given volume of water either in a dam-made lake using a deployment from a ship (FIG. 3 or FIG. 4), a buoy (FIG. 5), or the shore (FIG. 6).

The ability to automatically determine size and/or taxa of fish and marine mammals will also be of great value to commercial fishermen. Five possible embodiments of this invention for this use include trawl/drag fishing, drift-net fishing, seine fishing, long-line fishing, and pot fishing.

A trawl/drag fishing embodiment of this invention would provide fishermen with the ability to determine the size and/or taxa of fish prior to catching them and allow them to avoid marine mammals. Such an embodiment would provide the fisherman with a method of more efficiently harvesting fish while significantly reducing bycatch (undesirable fish). The deployment of the acoustic transmission and collection portion of this embodiment of this invention might be a ship-mounted system (FIG. 3), or towed-array deployed system that is either affixed to the trawl/drag, or a deployed system that is towed in the vicinity of the trawl/drag (FIG. 4).

Figure 4A:
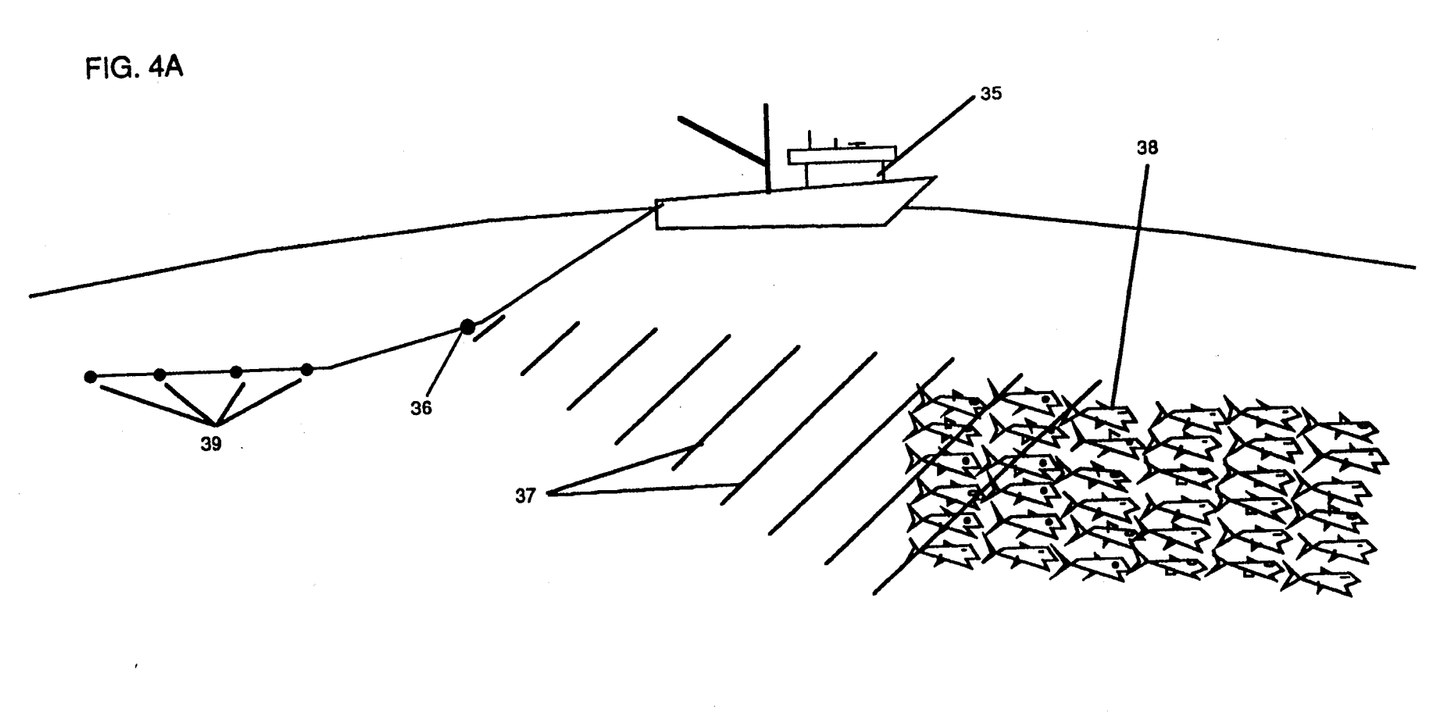
FIG. 4A provides a characterization of the use of this invention in a towed-array embodiment.
Figure 4B:
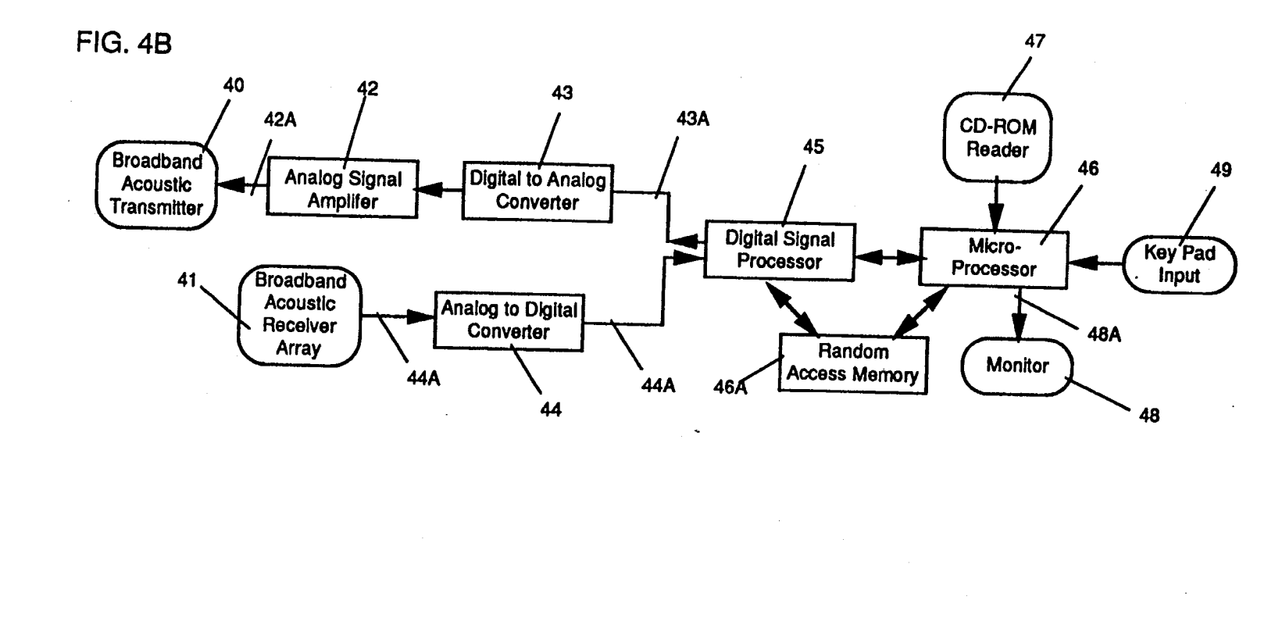
FIG. 4B illustrates a possible hardware configuration for the towed-array embodiment of this invention as it might be applied to commercial fishing, sport fishing, fisheries management, or environmental monitoring.
Figure 5A:
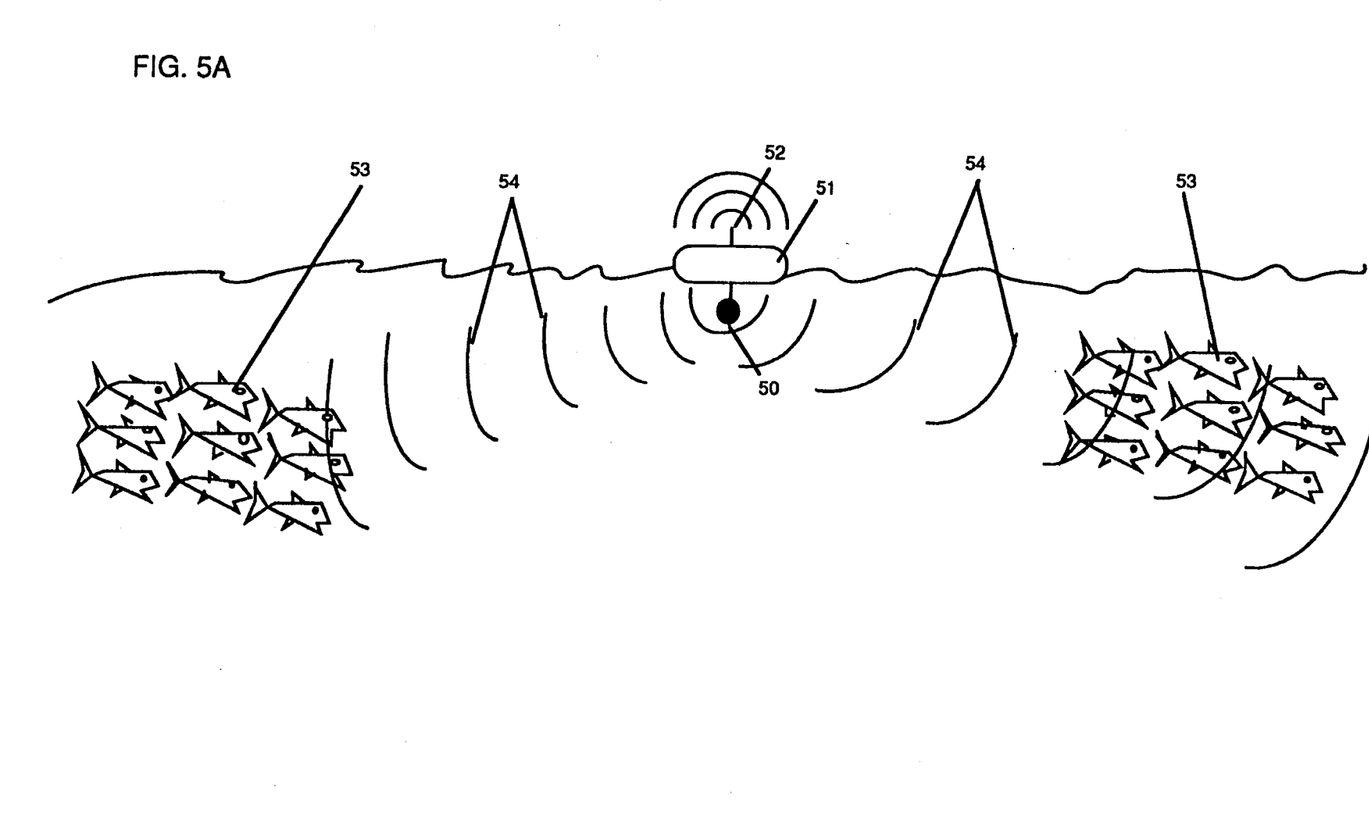
FIG. 5A provides a characterization of the use of this invention in a buoy-based embodiment.
Figure 5B:
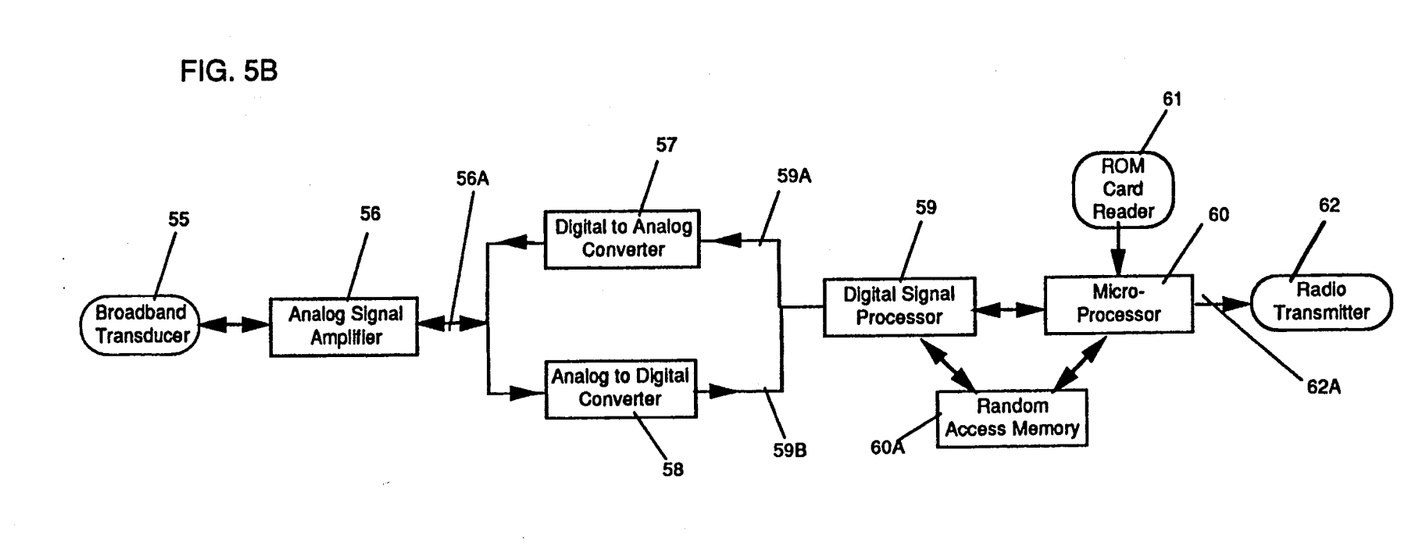
FIG. 5B illustrates a possible hardware configuration for the buoy-based embodiment of this invention as it might be applied to commercial fishing, sport fishing, fisheries management, or environmental monitoring.

A seine fishing embodiment of this invention would provide fishermen with the ability to determine the size and/or taxa of fish prior to catching them as well as avoid accidentally catching marine mammals. Such an embodiment would provide the fisherman with a method of more efficiently harvesting fish while significantly reducing bycatch (undesirable fish). The deployment of the acoustic transmission and collection portion of this embodiment of this invention might be a ship-mounted system (FIG. 3) or a towed-array system (FIG. 4). As a specific example of this embodiment of this invention, tuna seiners in the Eastern Tropical Pacific (ETP) require techniques for locating large schools of tuna that are not associated with dolphin. Using broadband acoustic emissions that are able to travel long distances underwater (say in the range from 2 kHz to 10 kHz), it will be possible to detect tuna using a towed array of hydrophones coupled with a high power acoustic transmitter. The acoustic array will be portable and deployed from the fishing vessel using a winch apparatus. A drift-net or longline or pot fishing embodiment of this invention would provide fishermen with the ability to identify fish or crustaceans. Such an embodiment would provide fisherman with a system that allows them to efficiently harvest their catch while significantly reducing bycatch. The deployment of the acoustic transmission and collection portion of this embodiment of this invention might be a ship-mounted system (FIG. 3), a towed-array system (FIG. 4), or a buoy deployed system (FIG. 5).

DRAWING FIGURES

The above and other objects, advantages and features of this invention will become more apparent when considered in conjunction with the following specification and accompanying drawings wherein.

Reference Numerals in Drawings

1 Sonar Control
2 A/D Converter
2A Digital Storage
3 Analog Signal Amplifier
4 Broadband Acoustic Signal Receiver
5 D/A Converter
6 Broadband Acoustic Signal Generator
7 Analog Signal Amplifier
8 Broadband Acoustic Signal Transmitter
9 Echo Detector
10 Feature Extractor
11 Classifier
12 Signature Data Base
13 Man-Machine Interface
14 Echo Store/Retrieve
15 Feature Store/Retrieve
16 Classifier Trainer
17 Performance Evaluator
22 Ship Deploying the Ship-Based Embodiment
23 Ship-Based Broadband Transducer
24 Fresh Water or Salt Water Fish in the Presence of a Ship
25 Broadband Acoustic Signals Produced by Ship-Based Transducer
26 Broadband Transducer
27 Analog Signal Amplifier
28 Digital to Analog Converter
28A Analog Broadband Acoustic Signals
29 Analog to Digital Converter
30 Digital Signal Processor
30A Broadband Digital Signal Produced by Digital Signal Processor
30B Broadband Digital Signal Produced by Analog to Digital Converter
31 Micro-Processor
31A Random Access Memory
32 CD-ROM Reader
33 Monitor
33A Data Displayed by Monitor
34 Key Pad Input
35 Vessel Deploying Towed Array Deployed Broadband Identifier
36 Broadband Acoustic Signal Transmitter
37 Broadband Acoustic Signals
38 Fresh Water or Salt Water Fish
39 Towed Array of Broadband Acoustic Receivers
40 Broadband Acoustic Transmitter
41 Broadband Acoustic Receiver Array
42 Analog Signal Amplifier
42A Analog Signal Transmitted to be Transmitted by Broadband Transmitter
43 Digital to Analog Converter
44 Analog to Digital Converter
44A Broadband Echoes Received by Each of the Broadband Receivers
45 Digital Signal Processor
46 Microprocessor
46A Random Access Memory
47 CD-ROM Reader
48 Monitor
48 Data to be Displayed by Monitor
49 Key Pad Input
50 Buoy-Based Broadband Transducer
51 Free-Floating or Anchored Fresh or Salt Water Deployed Buoy
52 Radio Transmitter
53 Fresh Water or Salt Water Fish
54 Broadband Acoustic Signals
55 Broadband Acoustic Transducer
56 Analog Signal Amplifier
56A Broadband Analog Acoustic Signals
57 Digital to Analog Converter
58 Analog to Digital Converter
59 Digital Signal Processor
59A Digital Broadband Acoustic Signal Produced by Digital Signal Processor
59B Digital Broadband Acoustic Signal Produced by Analog to Digital Converter
60 Microprocessor
60A Random Access Memory
61 ROM Card Reader
62 Radio Transmitter
62A Data to be Transmitted by Radio Transmitter
63 Shore-Based Broadband Acoustic Transducer
64 Shore Sonar Facility
65 Connection From Shore Facility to Broadband Acoustic Transducer
66 Fresh Water Fish
67 Broadband Acoustic Signals
68 Banks of River or Stream
69 Broadband Acoustic Transducer
70 Analog Signal Amplifier
70A Broadband Analog Acoustic Signal
71 Digital to Analog Converter
72 Analog to Digital Converter
73 Digital Signal Processor
73A Broadband Digital Time-Series Produced by the Digital Signal Processor
73B Broadband Digital Time-Series Produced by the Analog to Digital Converter
74 Microprocessor
74A Random Access Memory
75 8mm DAT Reader
76 Monitor
77 Key Pad Input
77A Data to be Displayed by the Monitor

Figure 1:
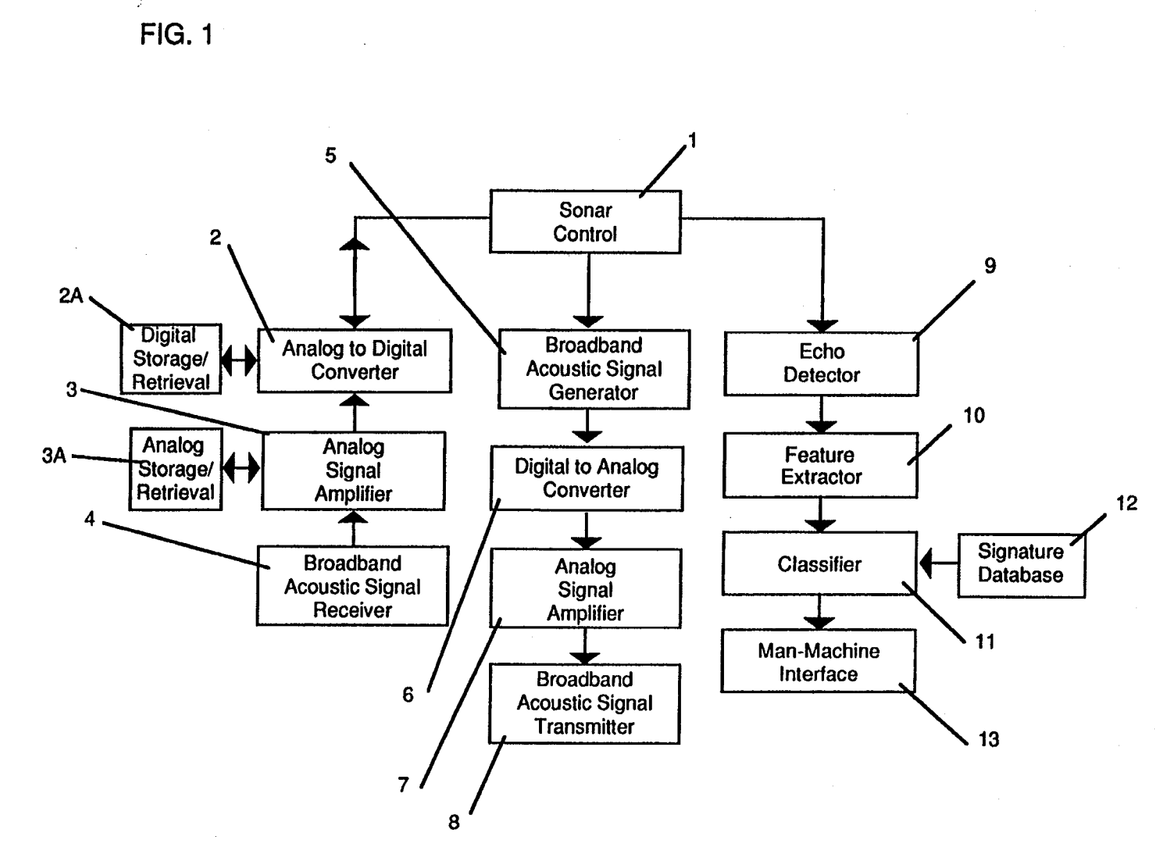
FIG. 1 is the primary functional description of this invention. This figure illustrates how a combination of broadband acoustic signals, signal processing, and classification are used to automatically identify the size and/or taxa of aquatic life.
Figure 2:
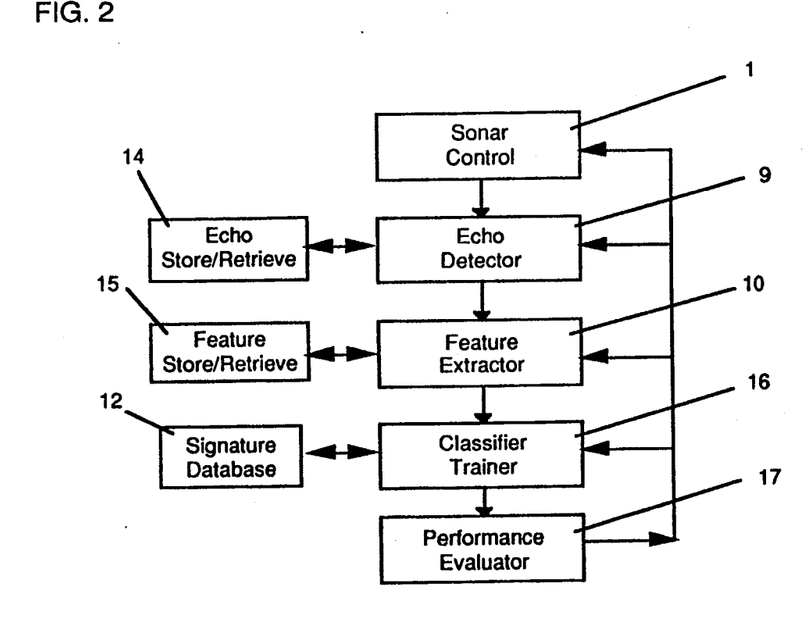
FIG. 2 illustrates how ground-truthed broadband acoustic receptions are used to create and store signatures of aquatic life.

DESCRIPTION - FIGS. 1 & 2

The disclosed invention describes a method of automatically identifying aquatic life forms from broadband acoustic signals. The method prescribed by this invention is described in two parts: (1) the operational portion of the system and (2) the classifier training portion of the system. FIG. 1 illustrates the functional flow for the first portion of this invention. For both portions of the system, all processing is controlled by the sonar control function 1. During operation, the sonar control function 1 controls three processes: (1) the generation and transmission of broadband acoustic signals, (2) the reception and digitization of broadband acoustic signals, and (3) the identification and display of aquatic life forms from echoes extracted from received digitized broadband acoustic signals. Each of these processes will be described below.

The generation and transmission of broadband acoustic signals begins within the sonar control function 1 which passes control to the broadband acoustic signal generator 5. The broadband acoustic signal generator 5 creates the transmitted waveforms based on certain programmable parameters such as the shape of the acoustic waveform, the signal duration, and the signal frequency range. Candidate broadband acoustic waveforms include clicks, chirps, and solitons. Once the acoustic waveforms are digitally created, they are passed to a Digital to Analog Converter 6 that produces the prescribed an analog signal. The analog signal is amplified by the analog signal amplifier 7 and then passed to the broadband acoustic signal transmitter 8 where it is transmitted in the aquatic environment.

Following the broadband signal transmission, the sonar control function 1 then passes system control to the broadband reception, digitization and storage functions. A Broadband receiver (or an array of receivers) 4 collects broadband echoes. The signal from each receiver is amplified with the analog signal amplifier 3 and possibly stored using an analog storage/retrieval device 3A such as a tape recorder. The amplified signals are passed to an analog to digital converter 2 at a sample rate that is at least twice the highest transmitted frequency. The digitized signals are optionally stored using a digital storage/retrieval device 2A such as digital audio tape, CD-ROM, diskette, or hard disk. The digital signals are stored with additional parameters used by the sonar control function 1, such as environmental conditions, target specifications, transmission and collection settings, and geographical location. Finally, the digitized signals are passed to the sonar control function 1 where beamforming is performed (if more than one acoustic receiver is used), resulting in a time-series of digital values.

The final function performed by sonar control 1 is the identification and display of the broadband echoes received. The digitized signals are passed from sonar control 1 to the echo detection function 9. The echo detection function 9 locates the consecutive digital samples in the time-series there are echoes from targets of interest (such as fish or marine mammals). The echo detection function 9 passes the consecutive samples that represent target echoes along to the feature extraction function 10 and it discards the remaining digital samples. The feature extraction function 10 measures features from the digital time-series from an echo or a series of consecutive echoes. Features might be measured from the raw digital samples or from transformations of the digital samples. Possible transformations include Fourier analysis, wavelet analysis, higher-order spectral analysis, and instantaneous time-frequency analysis. The extracted features will be used to represent the size and/or taxa of aquatic life.

During training, the features generated by the feature extraction process 10 will be used to train a classifier. The result of this training process is a set of coefficients that represent a specific aquatic life form class (such as small sockeye salmon or large harbor seal). These coefficients, called a signature, are stored in a signature database 12 where they are used to identify aquatic life forms during operation. The training process is illustrated in FIG. 2 and described in greater detail later in this disclosure.

During operation, the signatures for each aquatic life form of interest are retrieved from the signature database 12 and used by the classifier 11 to identify life forms. The signature database 12 is stored on a portable storage medium such as Read Only Memory (ROM) cards, digital audio tape, diskette, or Compact Disk (CD)-ROM. The classifier function 11 determines if the aquatic life form that produced a broadband echo correlates with an aquatic life form of interest that is stored in the signature database. There are several techniques that can be used as a classifier, including statistical classifiers, rule-based classifiers, or neural networks. The classifier passes its results to a man-machine interface function 13 that displays the information in a easily understood format. In addition to displaying the identification of targets, the man-machine interface function 13 also provides the operator with the ability to adjust various system parameters.

A separate classifier training system, illustrated in FIG. 2, is the second part of this invention. The sonar control function 1 passes digitized time-series to the echo detector 9 and the feature extractor 10 in the same manner as the operation described in FIG. 1. During the training process, the detected echoes can be optionally stored in an echo storage/retrieval device 14 and the extracted features can be optionally stored in a feature storage/retrieval device. These storage/retrieval devices could be DAT, ROM cards, CD-ROM, diskettes, or a hard-disk. The features extracted by the feature extractor 10 are passed to the classifier trainer 16. In addition to the extracted features, the identity of the aquatic life form that produced the set of features, the ground truth, is passed to the classifier trainer 16. Using these two pieces of information, the features and the ground truth, the classifier is trained and a set of coefficients is produced that discriminates each aquatic life form from the others. A performance evaluator 17 is used to determine when the discriminating coefficients are adequate. The coefficients are stored in the signature database 12 which are then used during operation as prescribed above. Throughout the classifier training process, it is possible to repeat any of the steps. The sonar control function 1 will arbitrate this training process.

EMBODIMENTS FIGS. 3-6

In FIGS. 3-6 are four separate embodiments of this invention. Each of these embodiments demonstrates a characterization of the application and a possible hardware configuration. The embodiments provided here are ship-based, towed-array, buoy-based, and shore-based.

Ship-Based Embodiment-FIG. 3

Figure 3A:
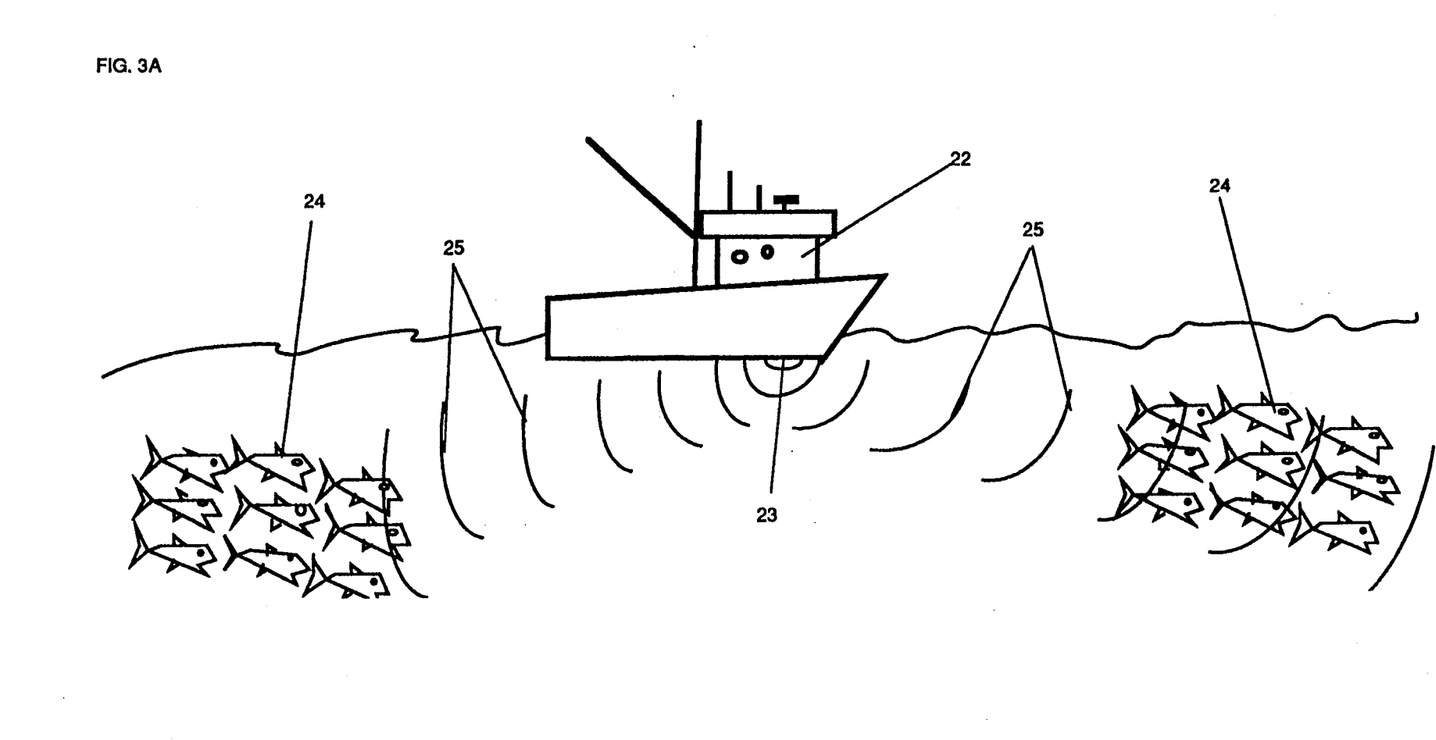
FIG. 3A provides a characterization of the use of this invention in a ship-based embodiment.

A characterization of the ship-based embodiment of this invention is illustrated in FIG. 3A. This embodiment of the invention is applicable to sport fishing, commercial fishing, and fisheries management. The use of this embodiment of the invention provides operators with the ability to identify fish by size and/or taxa. This embodiment of the invention is also applicable to environmental monitoring wherein assessment of plant life health, marine mammal location and identification, and other aquatic life form populations (i.e. shrimp or zooplankton) are of interest.

A ship 22 has a broadband transducer 23 attached to the hull below the waterline. The transducer is connected to a processing system housed within the vessel 22. The broadband transducer 23 transmits broadband acoustic signals 25 that are subsequently reflected off fish 24 in the presence of the ship 22 and received by the broadband transducer 23.

Figure 3B:
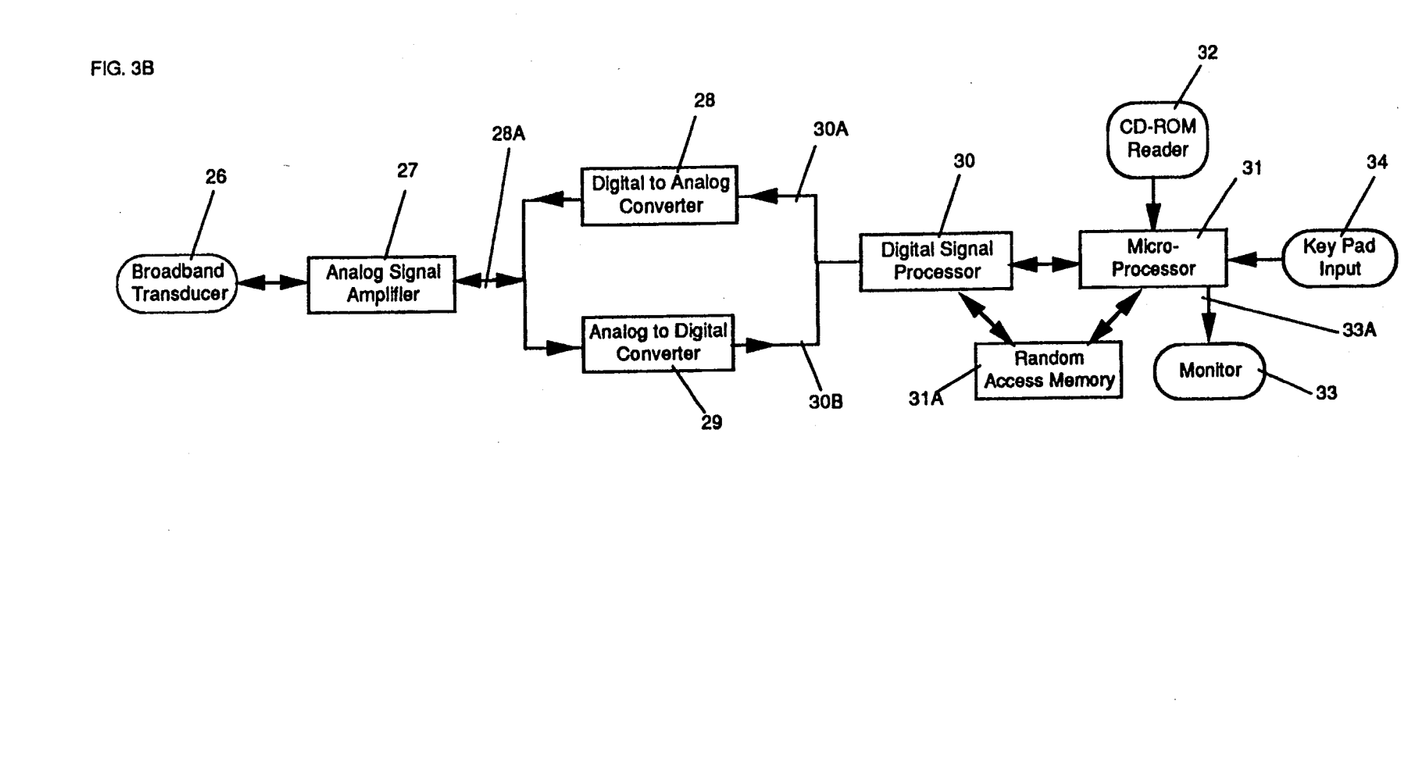
FIG. 3B illustrates a possible hardware configuration for the ship-based embodiment of this invention as it might be applied to commercial fishing, sport fishing, fisheries management, or environmental monitoring.

FIG. 3B illustrates a hardware configuration of the system deployed in FIG. 3A that comprises an embodiment of this invention. A broadband transducer 26 transmits and collects broadband acoustic signals. A sufficient broadband frequency range for this embodiment is considered to be 50 kHz to 200 kHz. The waveforms produced for this embodiment might include frequency modulated chirps and clicks.

The sonar control function is embodied in the digital signal processor 30 and the microprocessor 31. The digital to analog converter 28 is used to produce a broadband signal 30A generated by the digital signal processor 30. Both transmitted signals and received signals 28A are amplified by an analog signal amplifier 27. Broadband acoustic signals are transmitted and received in the water using the broadband transducer 26. The transducer 26 receives broadband echoes and passes them through the analog signal amplifier 27 to the analog to digital converter 29 where they are digitized and passed along as a time-series 30B to the digital signal processor 30.

The digital signal processor 30 performs echo detection, feature extraction, and classification. A suitable amount of Random Access Memory (RAM) 31A is used to store intermediate results throughout the process and act as a fast data transfer mechanism between the digital signal processor 30 and the microprocessor 31. The microprocessor 31 collects the signature database from a CD-ROM reader 32 and passes it to RAM 31A where the digital signal processor 30 can easily access it during classification. A monitor 33 displays the results of the automatic identification process 33A and a key pad input device 34 provides the operator with some adjustment capability.

Towed Away Embodiment-FIG. 4

A characterization of the towed array embodiment of this invention is illustrated in FIG. 4A. This embodiment of the invention is applicable to sport fishing, commercial fishing, and fisheries management. The use of this embodiment of the invention provides operators with the ability to identify fish by size and/or taxa and is especially useful for long range wide-area location and identification of fish schools. This embodiment of the invention is also applicable to environmental monitoring wherein assessment of plant life health, marine mammal location and identification, and other aquatic life form populations (i.e. shrimp or zooplankton) are of interest.

A ship 35 tows a broadband transmitter 36 and an array of broadband receivers 39. Both the broadband transmitter and the broadband receivers are connected to a processing system housed within the vessel 35. The broadband transmitter 36 transmits broadband acoustic signals 37 that are subsequently reflected off fish 38 and received by an array of broadband receivers 39.

FIG. 4B illustrates a hardware configuration of the towed array system deployed in FIG. 4A that comprises an embodiment of the invention. A broadband acoustic transmitter 40 transmits and an array of broadband acoustic receivers 41 collects broadband acoustic signals. A sufficient broadband frequency range for this embodiment is considered to be 2 kHz to 10 kHz. The waveforms produced for this embodiment might include frequency modulated chirps and clicks.

The sonar control function is embodied in the digital signal processor 45 and the microprocessor 46. The broadband acoustic transmitter 42 emits a broadband signal 42A generated by the digital signal processor 45, converted by the digital to analog converter 43, and amplified by the analog signal amplifier 42. The array of broadband acoustic receivers 41 receives broadband echoes 44A and passes them through the analog to digital converter 44, producing one digital time-series for each receiver 44A, and then passes the result to the digital signal processor 45.

The digital signal processor 45 beamforms the time-series to focus on a specific volume of water, then passes the beamformed time series to the echo detection, feature extraction, and classification functions. A suitable amount of Random Access Memory (RAM) 46A is used to store intermediate results throughout the process and act as a fast data transfer mechanism between the digital signal processor 45 and the microprocessor 46. The microprocessor 46 collects the signature database from a CD-ROM reader 47 and passes it to RAM 46A where the digital signal processor 45 can easily access it during classification. A monitor 48 displays the results of the automatic identification process 48A and a key pad input device 49 provides the operator with some adjustment capability.

Buoy-Based Embodiment-FIG. 5

A characterization of the buoy-based embodiment of this invention is illustrated in FIG. 5A. This embodiment of the invention is applicable to sport fishing, commercial fishing, and fisheries management. The use of this embodiment of the invention provides operators with the ability to identify fish by size and/or taxa. This embodiment of the invention is also applicable to environmental monitoring wherein assessment of plant life health, marine mammal location and identification, and other aquatic life form populations (i.e. shrimp or zooplankton) are of interest.

A buoy 51 has a broadband transducer 50 attached to a cable below the waterline. The transducer is connected to a processing system housed within the buoy 51. The broadband transducer 50 transmits broadband acoustic signals 54 that are subsequently reflected off fish 53 in the presence of the buoy 22 and received by the broadband transducer 50. Identifications are made using the on-buoy system and then transmitted by radio transmitter 52 to a receiving station.

FIG. 5B illustrates a hardware configuration of the system deployed in FIG. 5A that comprises an embodiment of this invention. A broadband transducer 55 transmits and collects broadband acoustic signals. A sufficient broadband frequency range for this embodiment is considered to be 50 kHz to 200 kHz. The waveforms produced for this embodiment might include frequency modulated chirps and clicks.

The sonar control function is embodied in the digital signal processor 59 and the microprocessor 60. The digital to analog converter 57 is used to produce a broadband signal 59A generated by the digital signal processor 59. Both transmitted signals and received signals 56A are amplified by an analog signal amplifier 56. Broadband acoustic signals are transmitted and received in the water using the broadband transducer 55. The transducer 55 receives broadband echoes and passes them through the analog signal amplifier 56 to the analog to digital converter 58 where they are digitized and passed along as a time-series 59B to the digital signal processor 59.

The digital signal processor 59 performs echo detection, feature extraction, and classification. A suitable amount of Random Access Memory (RAM) 60A is used to store intermediate results throughout the process and act as a fast data transfer mechanism between the digital signal processor 59 and the microprocessor 60. The microprocessor 60 collects the signature database from a ROM card reader 61 and passes it to RAM 60A where the digital signal processor 59 can easily access it during classification. A radio transmitter 62 transmits the results of the automatic identification process 62A to a receiving station.

Shore-Based Embodiment-FIG. 6

A characterization of the shore-based embodiment of this invention is illustrated in FIG. 6A. This embodiment of the invention is applicable to sport fishing, commercial fishing, and fisheries management. The use of this embodiment of the invention provides operators with the ability to identify fish by size and/or taxa. This embodiment of the invention is also applicable to environmental monitoring wherein assessment of plant life health, marine mammal location and identification, and other aquatic life form populations of interest.

A shore-based sonar facility 64 has a broadband transducer 63 attached to the shore below the waterline. The transducer is connected to a processing system housed within the shore-based facility 64 by a cable 65. The broadband transducer 63 transmits broadband acoustic signals 67 that are subsequently reflected off fish 66 swimming between the banks of a stream 68 and received by the broadband transducer 63.

FIG. 6B illustrates a hardware configuration of the system deployed in FIG. 6A that comprises an embodiment of this invention. A broadband transducer 69 transmits and collects broadband acoustic signals. A sufficient broadband frequency range for this embodiment is considered to be 50 kHz to 200 kHz. The waveforms produced for this embodiment might include frequency modulated chirps and dicks.

The sonar control function is embodied in the digital signal processor 73 and the microprocessor 74. The digital to analog converter 71 is used to produce a broadband signal 73A generated by the digital signal processor 73. Both transmitted signals and received signals 70A are amplified by an analog signal amplifier 70. Broadband acoustic signals are transmitted and received in the water using the broadband transducer 69. The transducer 69 receives broadband echoes and passes them through the analog signal amplifier 70 to the analog to digital converter 72 where they are digitized and passed along as a time-series 73B to the digital signal processor 73.

The digital signal processor 73 performs echo detection, feature extraction, and classification. A suitable amount of Random Access Memory (RAM) 74A is used to store intermediate results throughout the process and act as a fast data transfer mechanism between the digital signal processor 73 and the microprocessor 74. The microprocessor 74 collects the signature database from a 8mm DAT reader 75 and passes it to RAM 74A where the digital signal processor 73 can easily access it during classification. A monitor 76 displays the results of the automatic identification process 77A and a key pad input device 77 provides the operator with some adjustment capability.

What is claimed is:

1. A method of identifying an unknown aquatic life form comprising:
   a. transmitting broadband acoustic energy in water,
   b. receiving broadband acoustic energy in water,
   c. converting broadband acoustic energy into a stream of digital values
   d. detecting echoes reflected by aquatic life forms from a stream of digital values,
   e. converting a sequence of digital values from a detected echo into a set of features that uniquely identify an aquatic life form by size and/or taxa,
   f. retrieving classifier signatures from a portable storage medium,
   g. automatically identifying an aquatic life form by comparing stored signatures with features created during operation,
   h. displaying or transmitting the results of the automatic identification of an aquatic life form, and
   i. training a classifier and storing the parameters on a portable storage medium for use during operation.

2. An apparatus for identifying an unknown aquatic life form comprising:
   a. a means of transmitting broadband acoustic energy in water,
   b. a means of receiving broadband acoustic energy in water,
   c. a means of converting broadband acoustic energy into a stream of digital values
   d. a means of detecting echoes reflected by aquatic life forms from a stream of digital values,
   e. a means of converting a sequence of digital values from a detected echo into a set of features that uniquely identify an aquatic life form by size and/or taxa,
   f. a means of retrieving classifier signatures from a portable storage medium,
   g. a means of automatically identifying an aquatic life form by comparing stored signatures with features created during operation,
   h. a means of displaying or transmitting the results of the automatic identification of an aquatic life form, and
   i. a means of training a classifier and storing the parameters on a portable storage medium for use during operation.

3. The apparatus of claim 2 as it is applied to a ship-based deployment for the identification of aquatic life forms.

4. The apparatus of claim 2 as it is applied to a towed array deployment for the identification of aquatic life forms.

5. The apparatus of claim 2 as it is applied to a buoy-based deployment for the identification of aquatic life forms.

6. The apparatus of claim 2 as it is applied to a shore-based deployment for the identification of aquatic life forms.

7. The method of claim 1 applied to a ship-based deployment for the identification of aquatic life forms.

8. The method of claim 1 applied to a towed array deployment for the identification of aquatic life forms.

9. The method of claim 1 applied to a buoy-based deployment for the identification of aquatic life forms.

10. The method of claim 1 applied to a shore-based deployment for the identification of aquatic life forms.

* * * * *